(12) United States Patent
Stewart Lang

(10) Patent No.: US 12,312,777 B2
(45) Date of Patent: May 27, 2025

(54) APPARATUS TO HARVEST ATMOSPHERIC WATER VAPOR

(71) Applicants: Alfonso Hernández Mayén, Yucatán (MX); CONSOLIDANDO EL PATRIMONIO, S.A.P.I. DE C.V., Mexico City (MX); HEALIXA, INC, Manhattan, NY (US)

(72) Inventor: Daniel Stewart Lang, Yucatán (MX)

(73) Assignee: HEALIXA, INC, Manhattan, NY (US)

( * ) Notice: Subject to any disclaimer, the term of this patent is extended or adjusted under 35 U.S.C. 154(b) by 369 days.

(21) Appl. No.: 17/755,819

(22) PCT Filed: Nov. 9, 2020

(86) PCT No.: PCT/MX2020/050039
§ 371 (c)(1),
(2) Date: Nov. 10, 2022

(87) PCT Pub. No.: WO2021/096343
PCT Pub. Date: May 20, 2021

(65) Prior Publication Data
US 2023/0111690 A1  Apr. 13, 2023

(30) Foreign Application Priority Data
Nov. 12, 2019  (MX) .............................. 2020/001916

(51) Int. Cl.
*E03B 3/28*  (2006.01)
*B01D 5/00*  (2006.01)
(Continued)

(52) U.S. Cl.
CPC .............. *E03B 3/28* (2013.01); *B01D 5/0006* (2013.01); *B01D 5/0042* (2013.01); *C09K 5/06* (2013.01);
(Continued)

(58) Field of Classification Search
CPC ....... E03B 3/28; B01D 5/0003; B01D 5/0006; B01D 5/0042; B01D 9/0004; B01D 9/0013
See application file for complete search history.

(56) References Cited

U.S. PATENT DOCUMENTS 4,541,248 A * 9/1985 Andrepont ................ F25B 1/00
62/48.2
5,361,587 A * 11/1994 Hoffman .................. F25B 39/04
62/3.2
(Continued)

FOREIGN PATENT DOCUMENTS

GB          2381061 A    4/2003
KR       101017282 B1    2/2011
(Continued)

OTHER PUBLICATIONS

PCT International Search Report and Written Opinion with English Translation, dated May 20, 2021, regarding Application No. PCT/MX2020/050039, 15 pages.

*Primary Examiner* — Christopher R Zerphey
(74) *Attorney, Agent, or Firm* — Yee & Associates, P.C.

(57) ABSTRACT

The present disclosure is directed to devices, systems, and products for attracting, capturing and converting atmospheric water vapor into useful liquid water utilizing thermal dynamic processes such as deposition, phase change states and fusion.

7 Claims, 10 Drawing Sheets

(51) Int. Cl.
  *C09K 5/06* (2006.01)
  *F25B 9/14* (2006.01)
  *F25B 21/02* (2006.01)
  *F25B 39/02* (2006.01)
  *F25B 39/04* (2006.01)
  *F28D 20/02* (2006.01)
  *F28D 21/00* (2006.01)
  *F28F 3/12* (2006.01)

(52) U.S. Cl.
  CPC ............... *F25B 9/14* (2013.01); *F25B 39/02* (2013.01); *F25B 39/04* (2013.01); *F28D 20/021* (2013.01); *F25B 21/02* (2013.01); *F25B 2700/21171* (2013.01); *F28D 2021/0038* (2013.01); *F28F 3/12* (2013.01)

(56) References Cited

U.S. PATENT DOCUMENTS

| | | | | |
|---|---|---|---|---|
| 6,499,309 | B1* | 12/2002 | Yeh | B01D 5/0039 62/235.1 |
| 6,588,225 | B1* | 7/2003 | Hodgson | F25B 41/37 62/93 |
| 6,790,404 | B2* | 9/2004 | Yapel | B01D 67/0027 264/41 |
| 7,559,204 | B2* | 7/2009 | Hatamian | F24F 5/0042 62/3.4 |
| 7,722,706 | B2* | 5/2010 | Thielow | B01D 53/28 96/272 |
| 7,886,547 | B2* | 2/2011 | Sullivan | E03B 3/28 62/93 |
| 10,113,777 | B2* | 10/2018 | Otanicar | E03B 3/28 |
| 10,350,512 | B2* | 7/2019 | Rau, III | B01D 5/0003 |
| 10,458,704 | B2* | 10/2019 | Baxter | B01D 53/002 |
| 11,338,220 | B2* | 5/2022 | Otanicar | E03B 3/28 |
| 2010/0218917 | A1 | 9/2010 | Barnwell | |
| 2015/0033774 | A1 | 2/2015 | Ferreira et al. | |
| 2016/0160477 | A1* | 6/2016 | Wei | B01D 5/006 62/93 |
| 2023/0021519 | A1* | 1/2023 | Barker | B01D 53/002 |

FOREIGN PATENT DOCUMENTS

| | | |
|---|---|---|
| KR | 20180086109 A | 7/2018 |
| WO | 2001084066 A1 | 11/2001 |
| WO | 2018013562 A1 | 1/2018 |
| WO | 2020170243 A1 | 8/2020 |

* cited by examiner

APPARATUS TO HARVEST ATMOSPHERIC WATER VAPOR

CROSS-REFERENCE TO OTHER RELATED APPLICATIONS

This application claims priority to U.S. Provisional Application No. 61/413,995, filed on July Nov. 16, 2010 and U.S. Provisional Application No. 61/532,104 filed Sep. 8, 2011. The contents of these priority applications are herein incorporated by reference in its entirety.

FIELD

This disclosure generally relates to the harvest and/or sourcing of atmospheric water utilizing the thermal dynamic process known as deposition of water. This disclosure is also generally related to apparatuses designed to attract and capture water vapor within an atmosphere, instantaneously phase change the captured water vapor into a solid state in the form of frost, a process known as deposition, a mechanism to extract the frost acquired, a process to phase change the extracted frost into its liquid state, and finally, store and/or make available for use the liquid water for a wide variety of applications, systems, products, devices and/or components including, for example, potable water, drinking water, agriculture and other commercial or personal use.

BACKGROUND

Many devices, systems, and products exist and are in use today for harvesting water vapor from the atmosphere utilizing condensation. Because condensation of water is dependent on both temperature and pressure such devices, systems, and products must be designed and/or engineered to accommodate a multitude of constantly varying ambient temperatures and pressures of the incoming atmospheric air and constituent water vapor. Due to the aforementioned design and/or engineering considerations, these variations of ambient temperature and pressure add significant embedded system cost and ongoing energy costs in order to accomplish the required system water condensation conditions, as well as produce overall system collection efficacy.

In some products, engineering to accommodate the variable atmospheric ambient conditions adds extra size, weight and components to the overall package, increasing the final product, installation and operating costs. In most cases, a system's ability and efficacy in harvesting atmospheric water is directly tied to ambient relative humidity and temperature conditions. Low relative humidity and high temperatures degrade overall performance and in many cases useful water harvest is limited to systems being within atmospheric conditions of greater than thirty percent relative humidity. Further, in all current commercially available condensation based systems, at lower relative humidity levels, liquid water acquisition is decreased while the cost per unit of water acquired is increased. Additionally, at the occurrence when the dew point of water within an atmosphere is below the freezing point of water, current commercially available condensation based systems are incapable of water harvesting.

There are many other water sectors for acquiring and delivering useable liquid water, such as reservoirs, rivers, aquifers, groundwater wells, waste water treatment plants, and de-salinization plants. Many of these sources and systems have been successfully used for centuries. However, with ever increasing global human population, water scarcity is becoming increasingly more prevalent. Further, the capacity of current reservoirs, rivers and aquifers has been consistently on the decline against ever increasing human water demand and changing climate. Contamination of these sources is also adding to the inability of populations and industry to have access to usable liquid water. Moreover all of the aforementioned sources have embedded energy and maintenance costs when acquiring water from the source.

Additionally, in many cases, all of the aforementioned sources rely on distribution systems that are dependent on ancillary maintenance and energy. These ancillary requirements add additional cost per delivered unit of water to an end user.

There are numerous distribution methods currently employed to transport water to an end user. Some common examples are: aqueducts, pipes, trucks, ships, and/or different combinations of these methods. However, these methods generally fall short because energy costs and/or maintenance cost of the water delivery system increases with increased population size and age of the system. In many cases, even in first world cites, greater than thirty to fifty percent of deliverable water is lost due to leaky pipes on its way to end users. In the case of modern day aqueduct systems a significant volume of acquired deliverable water is evaporated to the atmosphere as it travels from source location to a local distribution plant local to end users. Moreover, in some cases, energy use for water acquisition, distribution and delivery is as high as twenty percent of a population's overall energy consumption.

Accordingly, there is a need for improved devices, systems, and/or products for harvesting and delivering usable clean water more efficiently and effectively in order to meet increasing water demand of growing human populations. Further, because human populations are increasingly migrating into cities with growing commercial and industrial interests within or nearby those populations, there is a need for improved devices, systems, and products to acquire the required water efficiently and effectively locally to reduce or eliminate water distribution, delivery and the associated maintenance costs. The present disclosure is directed to overcoming and/or ameliorating at least one of the disadvantages of the prior art.

SUMMARY

Exemplary embodiments described herein may relate to the harvest of water vapor acquired from the atmosphere (also referred to as atmospheric water vapor) utilizing the thermal dynamic process of deposition resulting in captured frost and/or ice. In exemplary embodiments, the captured frost and/or ice may be extracted from the collection area or surface and stored in a thermally controlled environment allowing the frost to melt into liquid water.

In exemplary embodiments, the acquired atmospheric water vapor may be harvested, converted, stored and/or delivered and therefore made available on demand at a user's desired location. For example, in exemplary embodiments, the devices, systems, and/or products may eliminate or reduce the need for distributed and/or delivered liquid water.

In exemplary embodiments, the desired amount of atmospheric water vapor may be acquired from atmospheres of various temperatures. For example, in exemplary embodiments, the devices, systems, and/or products may acquire the desired amount of atmospheric water vapor in any climate zone (e.g., tropical, temperate, or polar).

In exemplary embodiments, the desired amount of atmospheric water vapor may be acquired from atmospheres at various altitudes. For example, in exemplary embodiments, the devices, systems, and/or products may acquire the desired amount of atmospheric water vapor at sea level and/or high altitudes and at any altitude in between.

In exemplary embodiments, the desired amount of atmospheric water vapor may be acquired from atmospheres at various relative humidity (R.H.) levels. For example, in exemplary embodiments, the devices, systems, and/or products may acquire the desired amount of atmospheric water vapor at less than 5% R.H., 10% R.H., 20% R.H., 30% R.H. and/or greater R.H. levels.

In exemplary embodiments, the desired amount of atmospheric water vapor may be acquired from atmospheres of outdoor environments.

In exemplary embodiments, the desired amount of atmospheric water vapor may be acquired from atmospheres of indoor environments.

In exemplary embodiments, the desired amount of atmospheric water vapor may be acquired in a combination of atmospheres of indoor and/or outdoor environments.

In exemplary embodiments, the acquired atmospheric water vapor may be attracted into the device, system, and/or product, by use of a lower temperature within the system's collection area than that of the ambient atmosphere.

In exemplary embodiments, the acquired atmospheric water vapor may be attracted into the device, system, and/or product, by use of a lower pressure within the system's collection area than that of the ambient atmosphere.

In exemplary embodiments, the acquired atmospheric water vapor may be attracted into the device, system, and/or product, by use of some combination of lower temperature and lower pressure within the system's collection area than that of the ambient atmosphere.

In exemplary embodiments, the captured frost may be extracted by means of scraping the frost from a collection surface.

In exemplary embodiments, the captured frost may be extracted by means of utilizing vibrating frequencies upon the collection surface.

In exemplary embodiments, the captured frost may be extracted by means of gravity assisted by the employment of icephobic coatings on collection surfaces.

In exemplary embodiments, a low temperature of the collection area or surface may be achieved by means of a Refrigeration Cycle system (e.g., compressor, condensing coil, expansion device, evaporator coil and a working fluid).

In exemplary embodiments, a low temperature of the collection area or surface may be achieved by means of the Stirling Cycle system (e.g., Stirling chiller and regenerator).

In exemplary embodiments, a low temperature of the collection area or surface may be achieved by means of the Peltier effect (e.g., Thermoelectric module chiller and heatsinks).

In exemplary embodiments, a low temperature of the collection area or surface may be achieved by means of the Thermoacoustic Refrigeration system (e.g., Electro-acoustic transducer, resonator, regenerator, high and low temperature heat exchangers and acoustic medium or working fluid).

In exemplary embodiments, a low temperature collection area or surface may be initially achieved by means of controlled release of a liquid nitrogen cartridge and thereafter maintained by any of the cooling methods previously described.

In exemplary embodiments, a low temperature collection area or surface may be maintained by any of the cooling methods previously described with the addition of a phase change material (PCM) used as a thermal barrier within the collection area to reduce the work required by the system used for the cooling process. For example, encapsulation of the evaporation coil within a PCM with a phase change point of −35° C. to phase from a liquid to a solid, allows a system to be designed to have the cooling system of choice turn on at −36° C. and then off again at, for example −40° C., doing a minimal amount of work maintaining a 4° C., thermal delta, rather than constantly running at a much greater thermal delta from the ambient temperature of the atmosphere, for example 30° C., to the desired −40° C. which could be as much as a 70° C., thermal delta. Additionally, specific heat of a solid phase of matter is generally lower than that of its liquid or gas state, meaning it takes less energy per gram per ° C. to cool the PCM in its solid state than it would to cool the PCM in its liquid or gas state.

In exemplary embodiments, a lower than ambient pressure in the collection area may be achieved by maintaining a low temperature in the collection area and providing an exit means for cool dry air.

In exemplary embodiments, the heat generated by the system's cooling cycle may be used to melt the captured frost to liquid water.

In exemplary embodiments, the newly melted liquid water (chilled water) may be used to reduce the heat and thereby reduce the energy requirement of the system's cooling cycle. For example, the fan inlet for the condensing coil may be located to draw air across the chilled water tank of the system to reduce the fan speed required and therefore reduce the overall energy required of the system.

In exemplary embodiments, a portion of the capillary tube expansion device of a Refrigeration Cycle cooling system may be embedded into, or partially embedded into the cold PCM of the evaporation coil to control the state of the refrigerant at the end of the liquid line reducing system energy requirements.

In exemplary embodiments, the heat generated by the cooling system may be regulated and transferred to another system, for example a water heater or space heater, by use of a brazed plate heat exchanger, embedded in a liquid PCM mass, before or after the condensing coil reducing the work and energy required by the system.

In exemplary embodiments, the device, system, and/or product may be engineered to mount in a manner to ensure the water volume to be delivered to an end user is gravity fed thereby reducing or eliminating the use of pumps and ancillary maintenance and/or energy costs.

In exemplary embodiments, the device, system, and/or product may employ the use of additional filtration devices to deliver certified drinking water.

As well as the embodiments discussed in the summary, other embodiments are disclosed in the specification, drawings, and claims. The summary is not meant to cover each and every embodiment, combination, or variation contemplated for the present disclosure.

DESCRIPTION OF THE DRAWINGS

Exemplary embodiments will now be described, by way of example only, with reference to the accompanying drawings in which:

FIG. 2 is similar to FIG. 1 except that FIG. 2 discloses a means of conserving some of the cooling work done by the refrigeration cycle by embedding the evaporation coil in a low temperature encapsulated PCM.

FIG. 5 is similar to FIG. 2 except that in FIG. 5 the end of the condensing coil and the expansion device are also embedded in the low temperature encapsulated PCM disclosed in FIG. 2, FIG. 3 and FIG. 4.

FIG. 6 is similar to FIG. 5 except that in FIG. 10 a brazed plate heat exchanger replaces the fan and condensing coil transferring acquired thermal energy to a secondary system.

DESCRIPTION OF EXEMPLARY EMBODIMENTS

Figure 1:
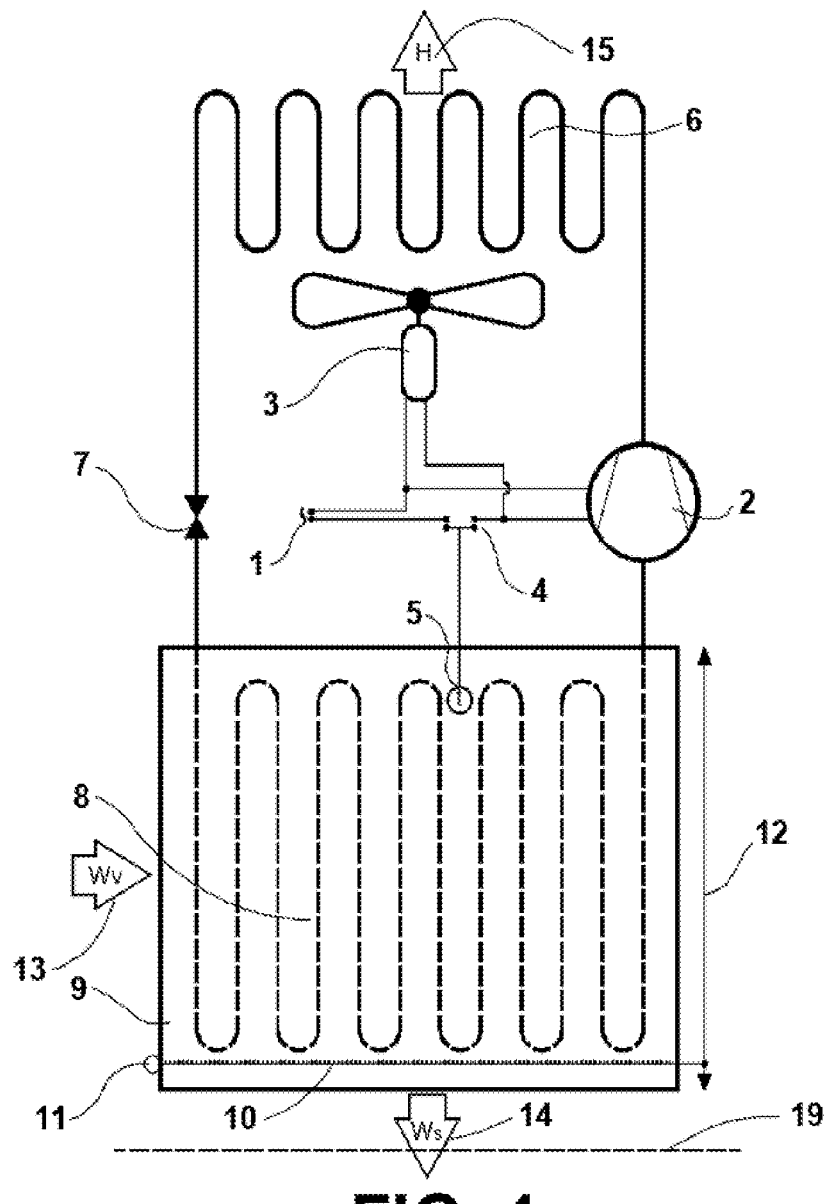
FIG. 1 is a schematic drawing of an exemplary embodiment of a system for harvesting atmospheric water vapor by means of the thermal dynamic process known as deposition.

Exemplary embodiments described herein are directed to attracting and harvesting atmospheric water vapor utilizing the thermodynamic process know as deposition of water, where water vapor "skips" the liquid phase and phases directly from vapor to ice or frost.

Exemplary embodiments described herein are directed to reducing the energy requirements of current refrigeration systems capable of achieving and maintaining sub-zero temperatures required for the deposition of water. Certain embodiments may be at least 10% or as much as 100% independent of electric grid energy and/or fossil fuels.

Exemplary embodiments described herein are directed to repurposing a small portion, or in other embodiments significant portions, of the thermal energy relieved from within the water vapor upon the water vapor's phase change into a solid phase. Certain embodiments may employ an ancillary system to repurpose the acquired thermal energy by converting the acquired thermal energy to kinetic energy to do work on the system utilizing a working fluid. For example, the thermal energy may be directed to an ancillary system where the thermal energy is used to drive a heat engine. The use of an ancillary system making use of the directed thermal energy may also reduce the primary system's condensing coil's work of rejecting waste heat into the environment, which in turn would lower the electrical requirement of the compressor.

Exemplary embodiments described herein may be beneficial for the natural and built environments as well as for economic reasons. In exemplary embodiments, the systems, methods and/or devices may eliminate or reduce the need for external electricity transmission into the system, at least for certain applications. In exemplary embodiments, the thermal energy acquired from the water vapor may be stored. In other exemplary embodiments, the thermal energy may be stored and may be transported to another location of the system or to an ancillary system.

Exemplary embodiments described herein are directed to exploiting the phase change of the captured frost into liquid water to assist the condensing side of the refrigeration cycle, lowering the energy requirements of the overall system.

Exemplary embodiments described herein may be beneficial for the natural and built environments as well as for economic reasons. In exemplary embodiments, the systems, methods and/or devices may eliminate or reduce the need for water to be provided by external water distribution and/or delivery systems, at least for certain applications. In exemplary embodiments, the systems, methods and/or devices may be installed directly at an end users location and directly connected to an end users internal water system. In certain applications, especially for new construction, exemplary embodiments described herein may reduce or eliminate the cost and/or maintenance of underground or other municipal water supply systems. In certain applications exemplary embodiments described herein may reduce or eliminate the cost of delivery of water by truck to an end user. Additionally, in exemplary embodiments described herein the systems, methods and/or devices may eliminate or reduce the need for water pumps of an end user.

FIG. 1 is a schematic drawing of an exemplary embodiment of a system for harvesting atmospheric water vapor utilizing the thermodynamic process known as deposition causing water vapor to instantaneously freeze. The exemplary embodiment of FIG. 1 is an improvement over current atmospheric water harvest systems which utilize the more commonly known thermodynamic process of condensation of water to harvest liquid water from the atmosphere.

The atmospheric water harvester of FIG. 1 is comprised of three processes. The first process is driven by the well established and commercially available refrigeration cycle used in everyday refrigerators and/or freezers. Input energy 1. A/C or D/C electricity, powers a compressor 2 and a fan 3 whose on/off states are determined by a switch 4 and temperature sensor 5. The closed loop refrigeration cycle is comprised of the compressor 2, condensing coil 6, expansion device 7 and evaporation coil 8. A volume of working fluid, typically a commercial refrigerant, is sealed within the aforementioned closed loop refrigeration cycle. When the system is in the "ON" state the compressor 2 turns on, compressing the working fluid within the condensing coil 6, typically in a vapor state when the system is "OFF", into a liquid. The fan 3 also turns on blowing ambient air across the condensing coil 6 to assist in a portion of the thermal energy 15 of the working fluid to exit out of the system through the walls of the condensing coil 6 and into ambient air. The process of compressing and rejecting thermal energy 15 from the working fluid condenses the working fluid from a vapor state to a liquid state. Further, this part of the refrigeration cycle is known as the "high pressure/high temperature side" of the system. "High pressure" is caused by the compressor 2 pumping refrigerant (the working fluid) into the condensing coil 6 at one end and the refrigerant flow being restricted by an expansion device 7 at the opposite end of the condensing coil 6. The "high temperature" is a result of the thermal energy 15 exiting the system through the walls of the condensing coil 6 at this stage of the process.

The expansion device 7 restricts the flow of the working fluid from the condensing coil 6 into the evaporation coil 8 on the opposing side of the system known as the "low pressure/low temperature side" of the system. Low pressure is caused inside of the evaporation coil 8 by the restriction of working fluid flow through the expansion device 7 on one side of the evaporation coil 8 and the suction caused by the compressor 2 on the opposite end of the evaporation coil 8. Working fluid, or refrigerant, enters the evaporation coil 8 upon exiting the expansion device 7 phasing into a vapor state due to the lower pressure within the evaporation coil 8. The phase change of the working fluid, from a liquid to a vapor, draws thermal energy 15 into the system through the walls of the evaporation coil 8, cooling the evaporation coil 8 and the attached frost collection surface 9 on its way back to the compressor. This cycle continues until the temperature of the frost collection surface 9, designed for the system process of harvesting atmospheric water vapor, is sensed by the temperature sensor 5 and opens the switch 4 turning "OFF" the compressor 2 and fan 3 of the refrigeration cycle. For example, the design temperature of the frost collection surface may be −10° C., −20° C., −30° C., −40° C., −50° C. or lower. Also for example, the sensor may be set to turn "ON" when the frost collection surface 9 temperature is above −10° C. and set to turn "OFF" when the frost collection surface 9 temperature is below −45° C.

The second process of the atmospheric water harvester of FIG. 1 is driven by a thermodynamic reactive process between constituent water vapor of the atmosphere coming into proximity and/or contact with the frost collection surface 9. This reactive process is a direct result of the second law of thermodynamics: a consequence of which necessitates a one-directional transfer of heat moving from a hotter body to a colder body. In the case of the atmospheric water harvester of FIG. 1 the hotter body is water vapor 13 interacting with the frost collection surface 9 the colder body. As is the case of any energy transfer system the larger the difference between the high temperature and low temperature the greater potential and transfer rate of energy.

The strength of a heat transfer process may be easily calculated and/or expressed using the law of heat conduction also known as Fourier's law.

$$Q = (k/s) A \, dT = U A \, dT$$

where

Q=heat transfer (W)
k=Thermal Conductivity of material (W/m° K)
s=material thickness (m)
A=heat transfer area (m$^2$)
U=k/s=Coefficient of Heat Transfer (W/(m$^2$° K))
dT=t1−t2=temperature gradient-difference-over the material (° C.)

In simpler terms, and with all other conditions of the above equation being static, the greater the dT between the hot body and colder body the greater the thermal transfer. For example, using 40° C. as the temperature of ambient water vapor 13 (hot body) and a system design temperature of the frost collection surface 9 (colder body) of −1° C., dT equals 41° C. Lowering the system design temperature of the frost collection surface 9 to, for example, −50° C. broadens the dT to 90° C., increasing the thermal energy transfer rate.

It is a well established conclusion detailed in numerous published scientific studies over the past 50 years that the largest factor influencing frost growth rate is the dT between water vapor 13 and a frost collection surface 9. These many studies where primarily done in an effort to understand frost growth rate conditions to assist engineers to develop ways in which to slow down or restrict the process of frost growth in the aerospace and refrigeration industries because frost buildup impacts negatively on systems within those industries. In the atmospheric water harvester of FIG. 1 the goal is the opposite, it is to speed up and promote frost growth.

Another factor of frost rate growth found in studies is that frost rate growth slows as the frost layer thickens. Most of the studies conclude that this slow down of frost growth is primarily due to two influences, the first is the crystalline characteristic of frost causing air pockets, or voids, in the frost that become the contact point of incoming water vapor 13 rather than the frost collection surface 9. The second is the influence of the frost layer itself, as it thickens it creates a thermal barrier, or insulation layer, between incoming water vapor 13 and the frost collection surface 9. The dT is narrowed and other thermal transfer properties such as k, s and A in the equation are no longer static. The water vapor 13 is no longer directly thermally interfacing with the frost collection surface 9, the water vapor 13 is interfacing with a frost layer. However, in a system designed for atmospheric water harvesting utilizing the deposition process optimizing rapid frost growth rates from water vapor 13 for the second process of the atmospheric water harvester of FIG. 1 is extremely important. The system of FIG. 1 may benefit by the temperature of the frost collection panel 9 being maintained at low temperature, for example −50° C., by the refrigeration process described above to guarantee there remains a large dT with the water vapor 13, which may be for example 40° C., as well as providing a means or process to strip away accumulating layers of frost 14 off and away from the frost collection surface 9 which shall be described below.

Therefore: the third process of the atmospheric water harvester of FIG. 1 is a scraper 10 driven by a scraper actuator 11 that is powered by electrical input energy 1. The scraper 10 moves along a fixed and timed scraper path 12 removing new layers of frost 14 off and away from the frost collection surface 9. For example, the scraper actuator may be programed to allow the frost 14 layer to reach a maximum depth of 0.1 mm before scraping occurs. While scraping the frost 14 off the frost collection surface of the atmospheric water harvester of FIG. 19 the frost 14 may be directed, for example by gravity, into a liquid water collection basin 21 and allowed to finally melt into liquid water 22 for use. The input energy required to cause the frost 14 entering the liquid water collection basin 21 to melt in most environments may be transferred by the much warmer, relative to the frost collection surface 9, atmosphere of the liquid water collection basin's 21 ambient environment.

Figure 2:
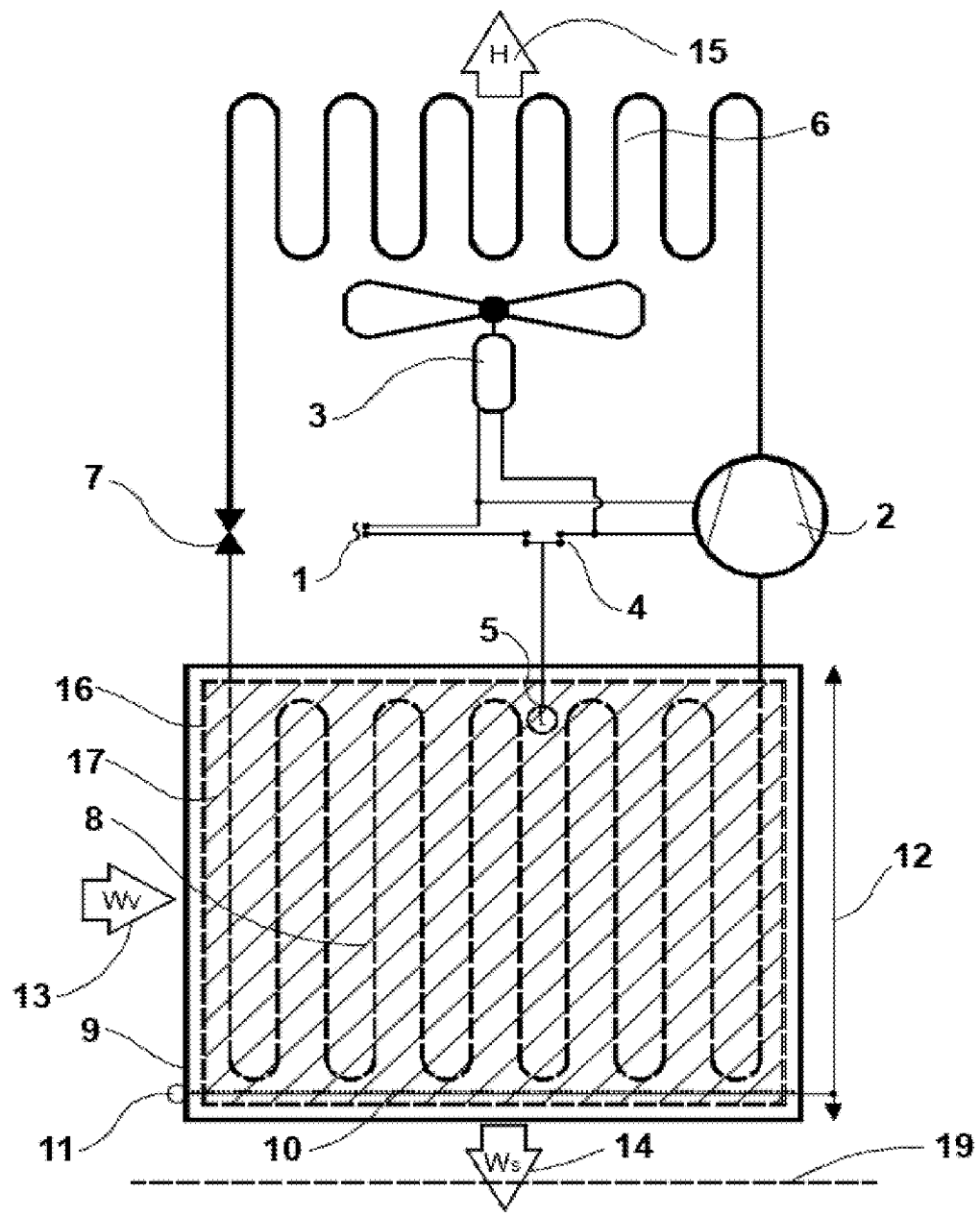
FIG. 2 is a schematic drawing of another exemplary embodiment of a system for harvesting atmospheric water vapor by means of the thermal dynamic process known as deposition.

FIG. 2 is a schematic drawing of another exemplary embodiment of a system for harvesting atmospheric water vapor by means of the thermal dynamic process known as deposition. FIG. 2 is similar to FIG. 1 except that in FIG. 2 conserving some of the cooling work done by the refrigeration cycle by embedding the evaporation coil 8 in a low temperature PCM 17 enclosed within a PCM encapsulation tank 16 which may reduce overall system cooling energy requirements.

Encapsulation of the evaporation coil 8 within a low temperature thermal storage PCM 17 eliminates contact between the evaporation coil 8 and the much warmer water vapor 13 to be cooled. Further, encapsulating the evaporation coil 8 as disclosed prevents, or reduces, the system of this embodiment from having to re-chill the frost collection surface 9 when the compressor cycles on and off. Doing so results in the advantage of a relevant portion the low temperature of the evaporation coil 8 done by the work of the compressor 2 is also preserved. Known refrigeration cycle system compressors commonly cycle on and off multiple times per day losing a significant portion, or in some cases all, of work accomplished by each cycle to the warm air surrounding the evaporation coil: however, when the evaporation coil 8 is encapsulated within a low temperature thermal storage PCM 17, a portion of the work of each cycle is con-served due to the low temperature thermal storage PCM 17 acting as an insulating barrier between the water vapor 13 and the evaporation coil 8. Moreover the addition of automatic valves, at the beginning and end of the evaporation coil 8, a low temperature thermal storage PCM 17 may maintain both the temperature and low pressure of the working fluid within the evaporation coil 8 during the "OFF" periods of the system operating cycle conserving a relevant portion of work done by the compressor 2 during the previous "ON" cycle.

Selection of an optimal low temperature thermal storage PCM 17 encapsulating the evaporation coil 8 may be based primarily on the desired design temperature of the frost collection surface 9 for purposes of maintaining a desired dT with incoming water vapor 13. For example, on an atmospheric water harvesting system in an environment that regularly reaches ambient temperatures above 30° C. and a desired design temperature of the frost collection surface 9 being determined to be −40° C., a low temperature thermal storage PCM 17 may be selected having a phase change temperature, from solid phase to liquid phase of, for example of −30° C.

There are two primary reasons for selecting a low temperature thermal storage PCM 17 of −30° C., in the example above. First, to maintain a frost collection surface 9 of −40° C., the low temperature thermal storage PCM 17 will have to be intermittently cooled to between −42° C. to −45° C. due to the incoming thermal energy of the water vapor 13 and the cooling capacity of the refrigeration cycle system. In such a temperature specific design of the system, the compressor's 2 temperature sensor 5 may be set to turn the system "ON", for example, at −42° C. and "OFF" again at −45° C. so that the refrigeration cycle only cools a 3° C. dT rather than a 75° C. dT of the difference between the desired −45° C. of the frost collection surface 9 and the 30° C. of incoming water vapor 13. Additionally, PCM's in solid phase generally require approximately 50 percent less energy to cool/heat than they do in their respective liquid stage. Water, for example, having a phase change point from liquid to solid or solid to liquid of 0° C. requires only 2.06 J/g° C. when in a solid state but requires 4.18 J/g° C., in a liquid state. Moreover, the phase change for the 1° C. temperature change at the phase change point requires an additional 334 J/g for that 1° C. change in temperature.

Most refrigeration systems have lower cooling capacities and efficiencies when their evaporator temperatures are below −20° C. and all solids have lower specific heat capacities in their respective solid states as well as typically being better heat conductors than in their liquid states. Simply put, it requires much less work, and thereby energy, to heat or cool a substance in its respective solid state than in its liquid state. Therefore, in operation, maintaining a predetermined mass of PCM at a temperature below −42° C. requires much less work than the refrigeration cycle cooling incoming amounts of water vapor and air from a changing outdoor environment to −45° C. In this manner, the refrigeration cycle of the system cools the low temperature PCM 17 mass only from, for example, −42° C. to −45° C. while the low temperature PCM 17 mass cools the incoming water vapor 13 from the water vapor's 13 incoming temperature to −45° C.

Second, an atmospheric water harvesting system may not be required to operate constantly. If the liquid water collection basin 21 is full for example, the entire system may be shut off by a user, whereby the compressor will no longer cycle. A system may be shut off for routine cleaning or maintenance work to be done. The low temperature PCM 17 mass will slowly rise in temperature, at a rate dependent primarily on how well the PCM encapsulation tanks 16 are insulated from warmer adjoining environments. However, if the low temperature PCM 17 has a phase change temperature of −30° C., as is in the above example, the latent heat of fusion will extend the time it takes to warm from −30° C. to −29° C. by a time factor of over 100 times the preceding temperature rises per degree C. If the PCM encapsulation tanks 16 are well insulated from warmer temperatures, the low temperature PCM 17 may remain at −30° C., for days rather than minutes. In contrast, a standard evaporation coil 8 without a low temperature PCM 17 encapsulation, even if insulated well will warm very close to ambient temperature within minutes of system shut down. Moreover, restarting the system without a low temperature PCM 17 encapsulation may require a thermal "pull-down" of 95° C. to achieve a −40° C. frost collection surface temperature, whereas with the addition of a low temperature PCM 17 encapsulation around the evaporation coil 8 the system may only require a thermal "pull-down" of, for example, 15° C. saving both time and energy on restart.

Figure 3:
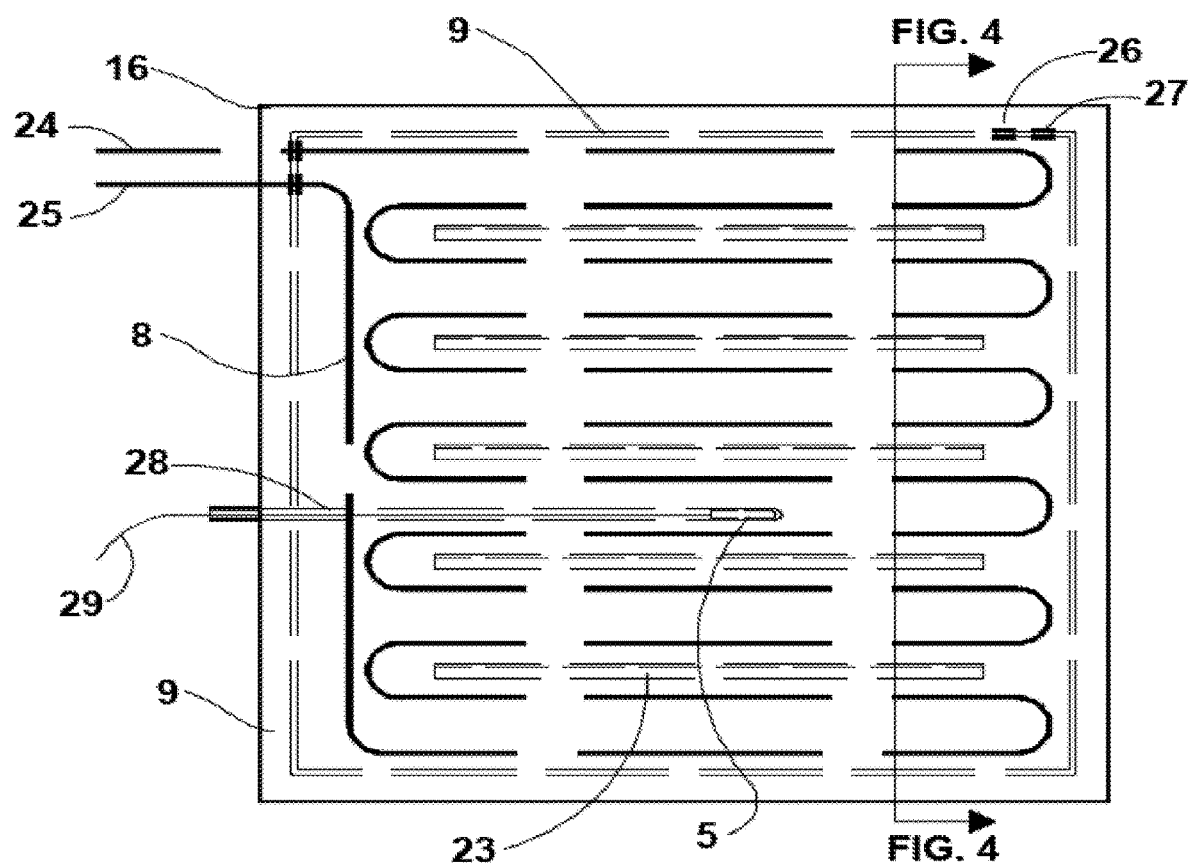
FIG. 3 is a schematic drawing of the embedded evaporation coil of FIG. 2.
Figure 4:
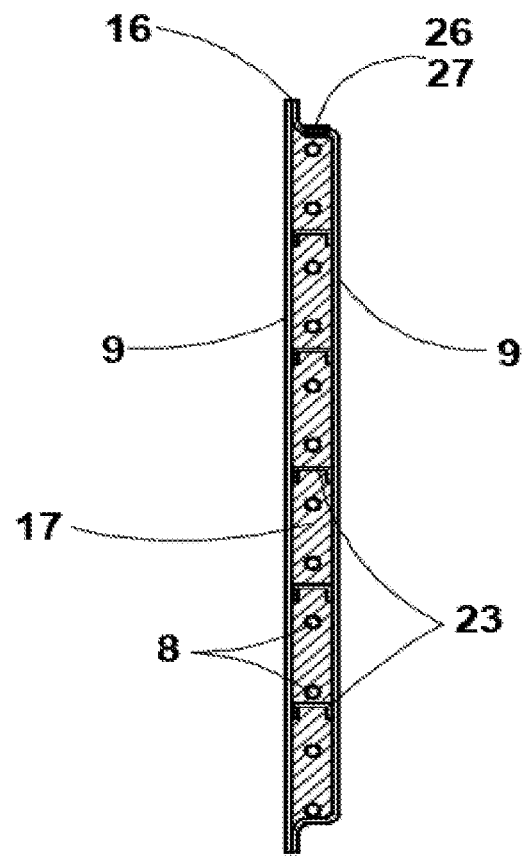
FIG. 4 is a cross sectional view of the embedded evaporation coil of FIG. 3.

FIG. 3 and FIG. 4 are schematic drawings of the embedded evaporation coil 8 inside a PCM encapsulation tank 16 disclosed in FIG. 2. The exemplary embodiments of FIG. 3 and FIG. 4 disclose useful design methods of selecting the materials and material properties of the PCM encapsulation tank 16 beneficial to the process of deposition of water. The PCM encapsulation tank's 16 front and back surfaces are each frost collection surfaces 9. An impermeable material with good thermal conductivity should be used for the PCM encapsulation tank 16 structure. Additionally, wall thickness, material thickness, reactivity to the atmosphere, reactivity to the PCM, finish smoothness, case of fabrication and material availability are also important characteristics for proper selection. For example, the PCM encapsulation tank 16 will be exposed to water vapor, remain at temperatures below −30° C., for extended periods of time and be holding a low temperature PCM 17 that, for example, may contain percentages of distilled water and ethanol mixed to set the low temperature PCM 17 phase change design temperature. The smoother the finish of the outside surfaces of PCM encapsulation tank 16, that are also the frost collection surfaces 9, the more easily accumulated frost 14 may be removed. Aluminum sheet grades such as 1100, 3003, 3004 and 5052 may be used as the PCM encapsulation tank 16 shell given these grades are corrosion resistance, have high thermal conductivity, are light weight, and are readily available in the market. Stainless Steel 316 sheet may also be used over the aforementioned Aluminum grades as the PCM encapsulation tank 16 shell due to Stainless Steel's young modulus and tensile strength over the Aluminum grades which may be selected based on price and weight. The Aluminum and Stainless Steel grades described herein are as an example only, other materials may be chosen based on the values of the aforementioned material properties. Because the frost collection surfaces 9 should be flat, interior tank bracing 23 channels are attached to the inside faces of the tank, to prevent surface deformation, using corrosion resistive epoxy capable of withstanding temperatures below −45° C.

The evaporation coil 8 enters the PCM encapsulation tank 16 through an evaporator inlet hole 24. The evaporation coil 8 is shaped to bend around the interior tank bracing 23 channels and may be evenly distributed inside the PCM encapsulation tank 16 to best provide equal cooling of the low temperature PCM 17 encapsulated inside the PCM encapsulation tank 16 it is enclosed in. The evaporation coil 8 exits the PCM encapsulation tank 16 through an evaporator outlet hole 25. The evaporator inlet hole 24 and the evaporator outlet hole 25 require sealing to the outside of the PCM encapsulation tank 16 to prevent degrading the low temperature PCM 17 over time. Additionally, a temperature sensor tube 28 may be installed and affixed to the inside of the PCM encapsulation tank 16. The temperature sensor tube 28 requires sealing to the outside of the PCM encapsulation tank 16 to prevent degrading the low temperature PCM 17 over time. PCM encapsulation tank 16 edges may be closed to form a sealed tank mechanically, using adhesives and/or welded. A PCM tank filler opening 26 and PCM tank breather opening 27 may be used to fill the tank with the low temperature PCM 17 after the tank is sealed. The PCM tank filler opening 26 and PCM tank breather opening 27 may be sealed in the PCM encapsulation tank 16 to prevent degrading the low temperature PCM 17 over time.

Figure 5:
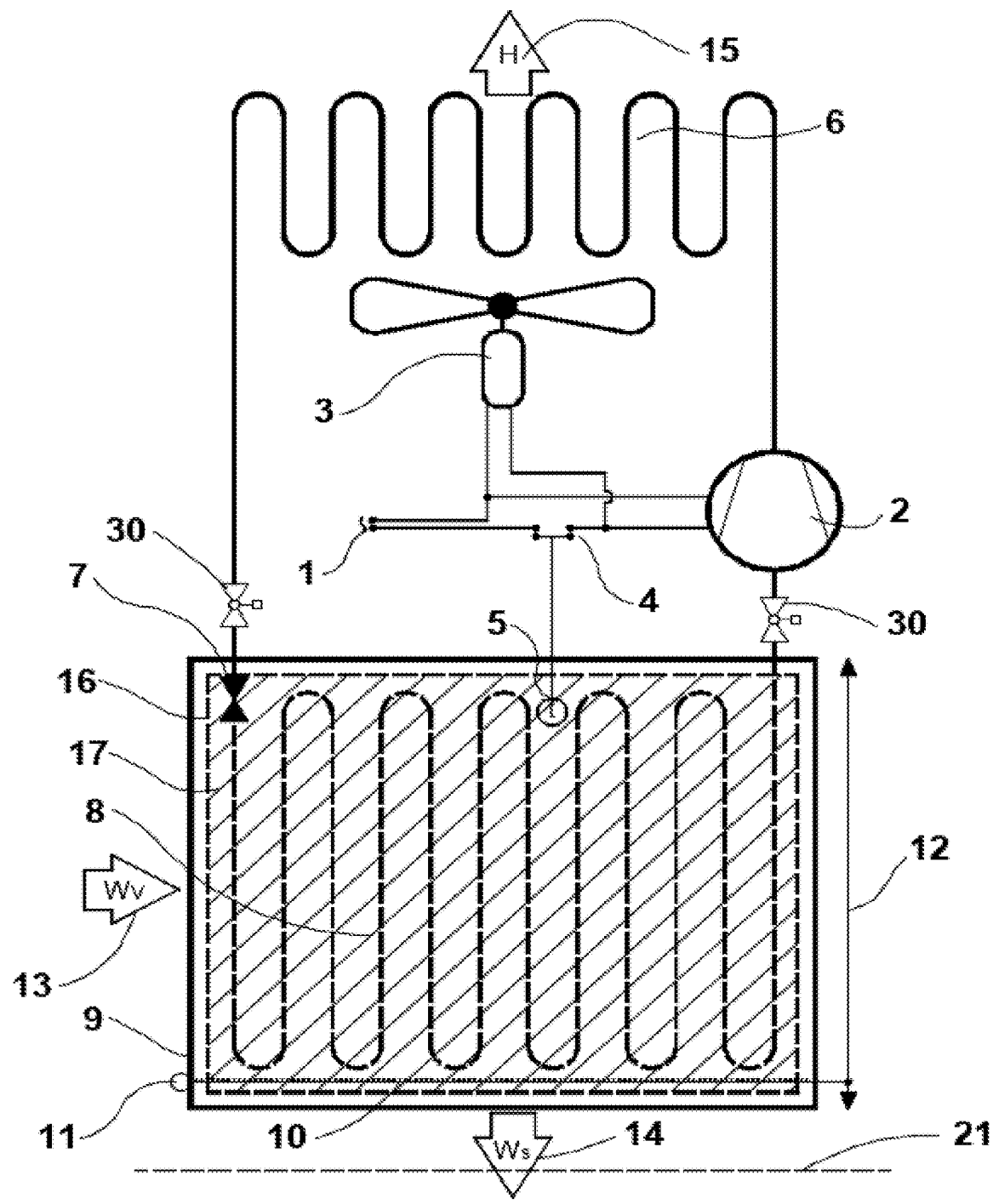
FIG. 5 is a schematic drawing of another exemplary embodiment of a system for harvesting atmospheric water vapor by means of the thermal dynamic process known as deposition.

FIG. 5 is a schematic drawing of another exemplary embodiment of a system for harvesting atmospheric water vapor by means of the thermal dynamic process known as deposition. FIG. 5 is similar to FIG. 2 except that in FIG. 5 the end of the condensing coil 6 and the expansion device 7 are also enclosed in the PCM encapsulation tank 16 disclosed in FIG. 2. FIG. 3 and FIG. 4. It is well understood in the refrigeration industry that refrigerant subcooling is a reliable way of improving the performance of systems and saving energy. Many approaches to subcool the refrigerant in the condensing coil 6, compressor 2 as well as using an analogous and separate system are known and in use. These approaches typically add complexity and cost to a refrigeration cycle system. There has been considerable study on the subject mainly because there is enough understanding that the quality of refrigerant before entering the evaporator will effect overall system performance. A new approach described herein, is possible because of the evaporation coil 8 being embedded in the low temperature encapsulated PCM 17 held in a PCM encapsulation tank 16. Subcooling of the refrigerant may be done both at the end of the condensing coil 8, also referred to in the industry as the "liquid line", and in a capillary tube expansion device 7. Subcooling is much easier and simplified in these two locations due to the relatively small amount of refrigerant in these locations at a given time as compared to other locations in the refrigeration cycle. The refrigerant at these locations are more or less "captive" and may be easily thermally influenced. Further, the PCM encapsulation tank 16, the low temperature PCM 17, and the the evaporation coil's temperatures are dropping in temperature during the cycle allowing the availability of a tremendous heat sink compared to the small amount of refrigerant. There are two additional benefits of subcooling the refrigerant just prior to the expansion device 7 in addition to reducing some of the work load of subcooling from the compressor 2 and condensing coil 6.

The first benefit is to guarantee the refrigerant is indeed fully in a liquid state as it passes through the expansion device 7 into the evaporation coil 8. The second benefit is that a lower temperature liquid refrigerant will have a higher viscosity resulting in a greater resistance within the expansion device. Therefore, placing the liquid line in an air pocket inside the PCM encapsulation tank 16, may effectively lower the work load of both the compressor 2 and condensing coil 8 with no additional cost to the system.

FIG. 5 also differs from the system disclosed in FIG. 2 by the inclusion of two ball valves 30. One ball valve 30 is inline immediately before the expansion device 7 and a second ball valve 30 is inline immediately after the evaporation coil 8. The purpose of the two ball valves 30 is to conserve the cooling work done on the low temperature PCM 17 by the refrigeration cycle by stopping the refrigerant flow when the compressor 2 is "OFF" by closing the two ball valves 30. Without the two ball valves 30 added to the cycle, although the compressor 2 turns off, refrigerant on the high pressure side of the system, inside the condensing coil 6, will continue to flow to the lower pressure side until both sides are at equal pressures. Without the compressor 2 "ON" this flow brings with it heat from the condensing coil 6 into the evaporation coil 8 which will be absorbed by the cooler low temperature PCM adding unnecessary work in the next "ON" cycle. When the Compressor 2 is "ON" the two ball valves 30 are opened to allow the refrigerant to cycle normally.

Figure 6:
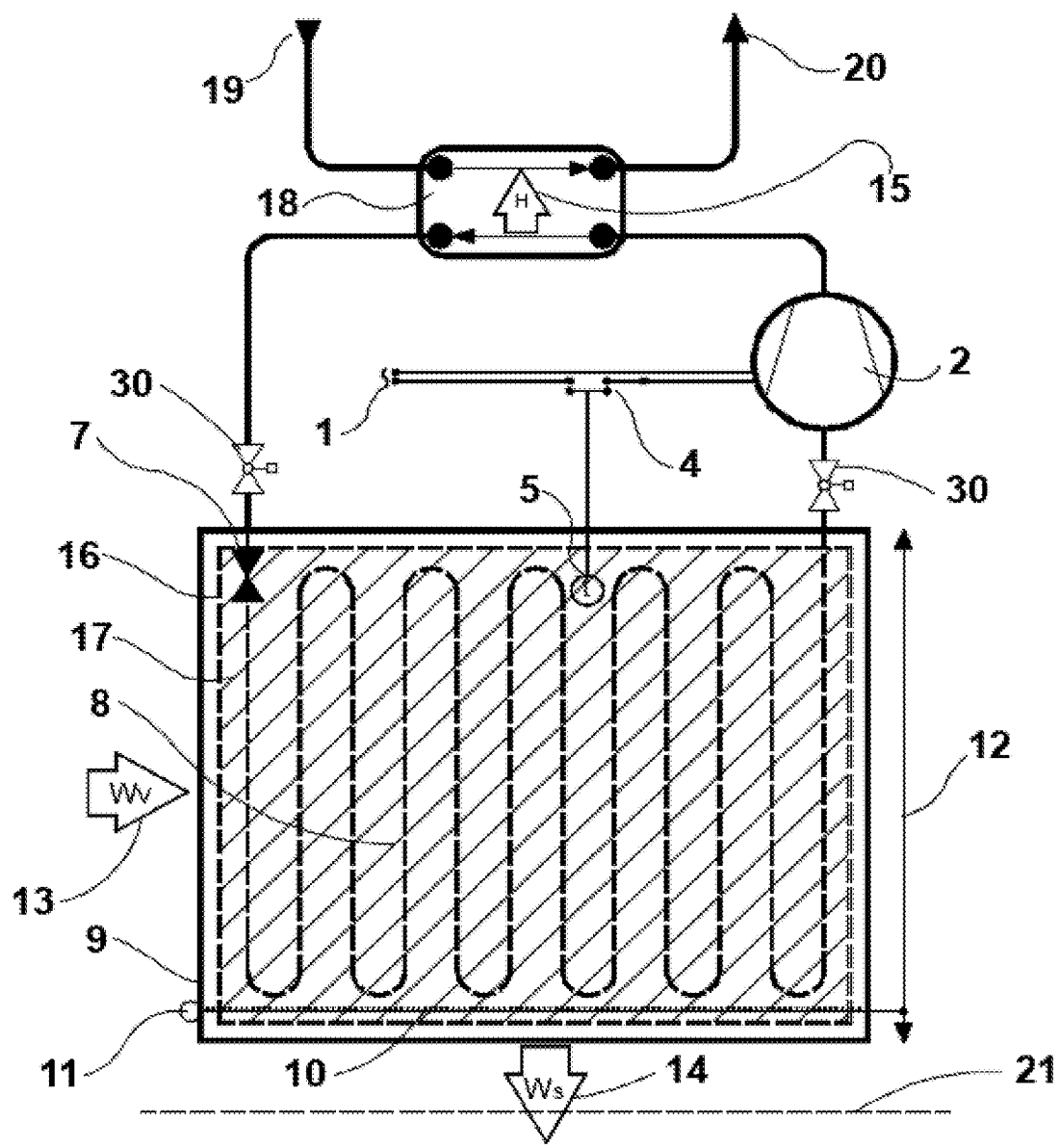
FIG. 6 is a schematic drawing of another exemplary embodiment of a system for harvesting atmospheric water vapor by means of the thermal dynamic process known as deposition.

FIG. 6 is a schematic drawing of another exemplary embodiment of a system for harvesting atmospheric water vapor by means of the thermal dynamic process known as deposition. FIG. 6 is similar to FIG. 5 except that in FIG. 6 a brazed plate heat exchanger 18 replaces the fan 3 and condensing coil 6 transferring acquired thermal energy to a secondary system. It may be useful, at least in some applications, to transfer the thermal energy 15, acquired from the refrigeration cycle, to a separate system that may make use of the thermal energy 15. In the exemplary embodiment of FIG. 6 the refrigerant flow exiting the compressor 2 flows through a brazed plate heat exchanger 18 before entering the expansion device 7 of the system. The working fluid of a secondary system enters the opposing side of the brazed plate heat exchanger 18 through an in-flow conduit 19. As the working fluid of the secondary system passes through the brazed plate heat exchanger 18, in the opposite flow direction of the refrigeration cycle of the compressor 2, thermal energy 15 from the refrigeration cycle after the compressor 2 is transferred to the working fluid of the secondary system and thereby condenses the working fluid of refrigeration system achieving the work typically done by a condensing coil 8 and fan. As an example the secondary system may be useful as a water heater or for space heating an environment.

Figure 7:
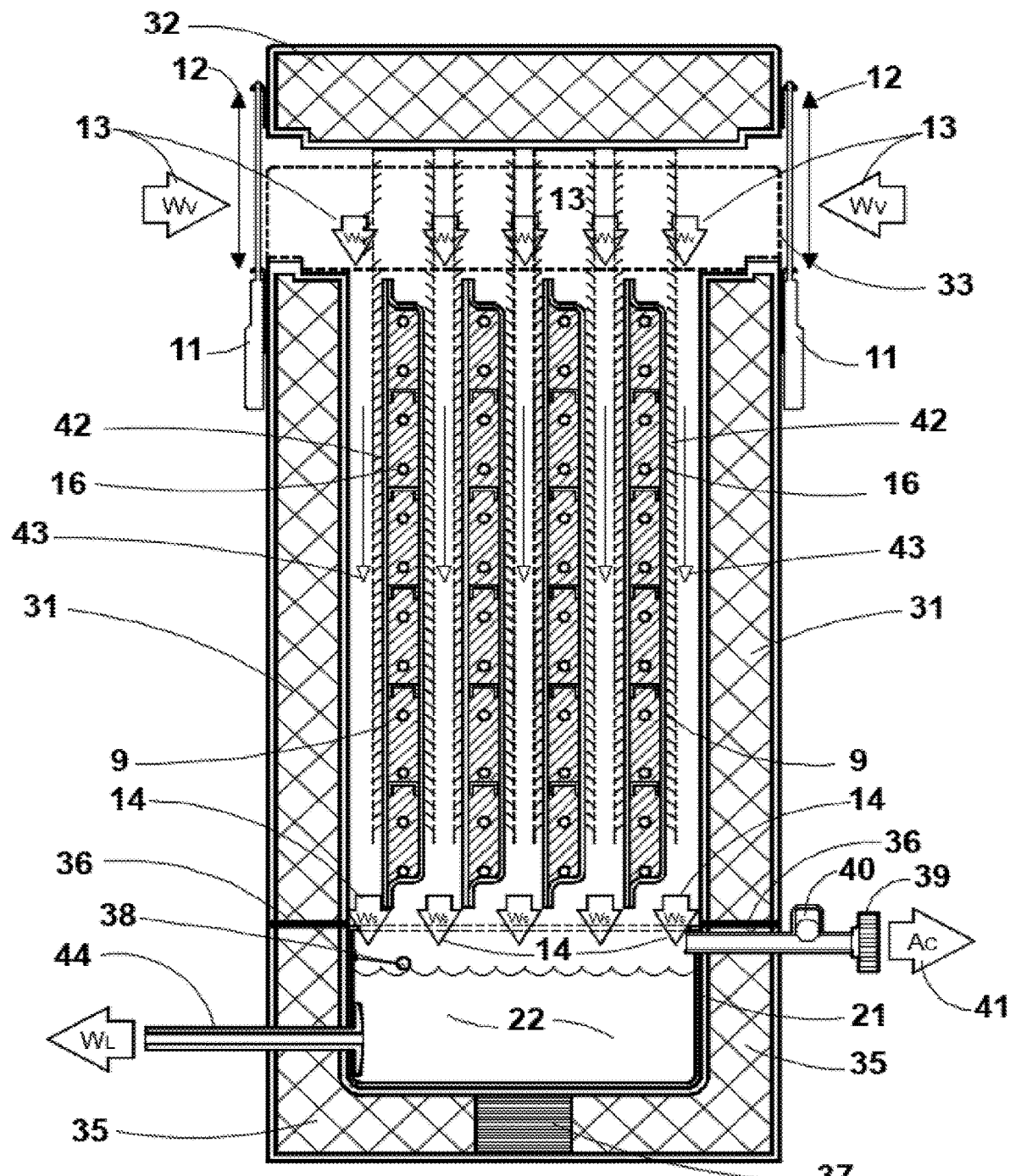
FIG. 7 is a schematic drawing of the exemplary embodiments disclosed in FIG. 1, FIG. 2, FIG. 5 and/or FIG. 6 disclosing a method to attract, direct and cycle atmospheric water vapor into and out-of the collection area.

FIG. 7 is a schematic drawing of the exemplary embodiments disclosed in FIG. 1. FIG. 2.

FIG. 5 and/or FIG. 6 disclosing a method to attract, direct and cycle atmospheric water vapor 13 into and out-of the collection area of the system. In the exemplary embodiment of FIG. 7 the process to attract, direct and cycle atmospheric water vapor 13 into and out-of the collection area of the system does not begin until the refrigeration process previously disclosed in FIG. 1. FIG. 2. FIG. 5 and/or FIG. 6 has achieved the desired design temperature of the frost collection surface 9, for example −40° C. While the refrigeration cycle is running during this "pull-down" process the insulated lid 33 is in the closed position and is sealed by the lid seal 34. The collection area is thermally protected by an insulated shell 31. The liquid water collection basin 21 is attached to the bottom of the collection area with a tank seal 36. Once the frost collection surfaces 9 are at the appropriate temperature the scraper actuator 11 lifts the insulated lid 32 with attached scraper panels 42 along the scraper path 12 until it reaches the open position. After a predetermined time, the scraper actuator 11 reverses and the insulated lid 33 closes and re-seals the collection area. The lid remains closed for a predetermined time and the process repeats until the process is stopped by a water float valve 38 indicates the liquid water collection basin 21 is full. The above process restarts and repeats when the water float valve 38 indicates the water level in the liquid water collection basin 21 has dropped. When the insulated lid 32 with attached scraper panels 42 is in the open position, warm ambient air and water vapor 13 are drawn into the collection area by both a thermal and pressure attraction. When the insulated lid 33 with attached scraper panels 42 is in the closed position the water vapor 13 instantaneously attaches as frost 14 to the frost collection surfaces 9. The remaining air in the collection area is cooled and drops down the collection area into the liquid water collection basin 21 and out to the outside ambient environment through the cool dry air vent 39 after passing through an air float valve 40. As the insulated lid 32 with attached scraper panels 42 opens again the frost 14 collected on the frost collection surfaces 9 is scrapped up and outward by the scraper panels 42 away from the frost collection surfaces 9 where it drops and eventually falls into the liquid water collection basin 21. The bottom of the liquid water collection basin 21 is fitted with a tank thermal sink 37 to ensure the bottom of the tank is above 0° C. to ensure the frost 14 melts into liquid water 22. The above process repeats until the process is stopped when the water float valve 38 indicates the liquid water collection basin 21 is full and restarts when the water float valve 38 indicates the water level in the liquid water collection basin 21 has dropped. Liquid water 22 may be removed from the liquid water collection basin 21 through a liquid water outlet 44 for use.

Figure 8:
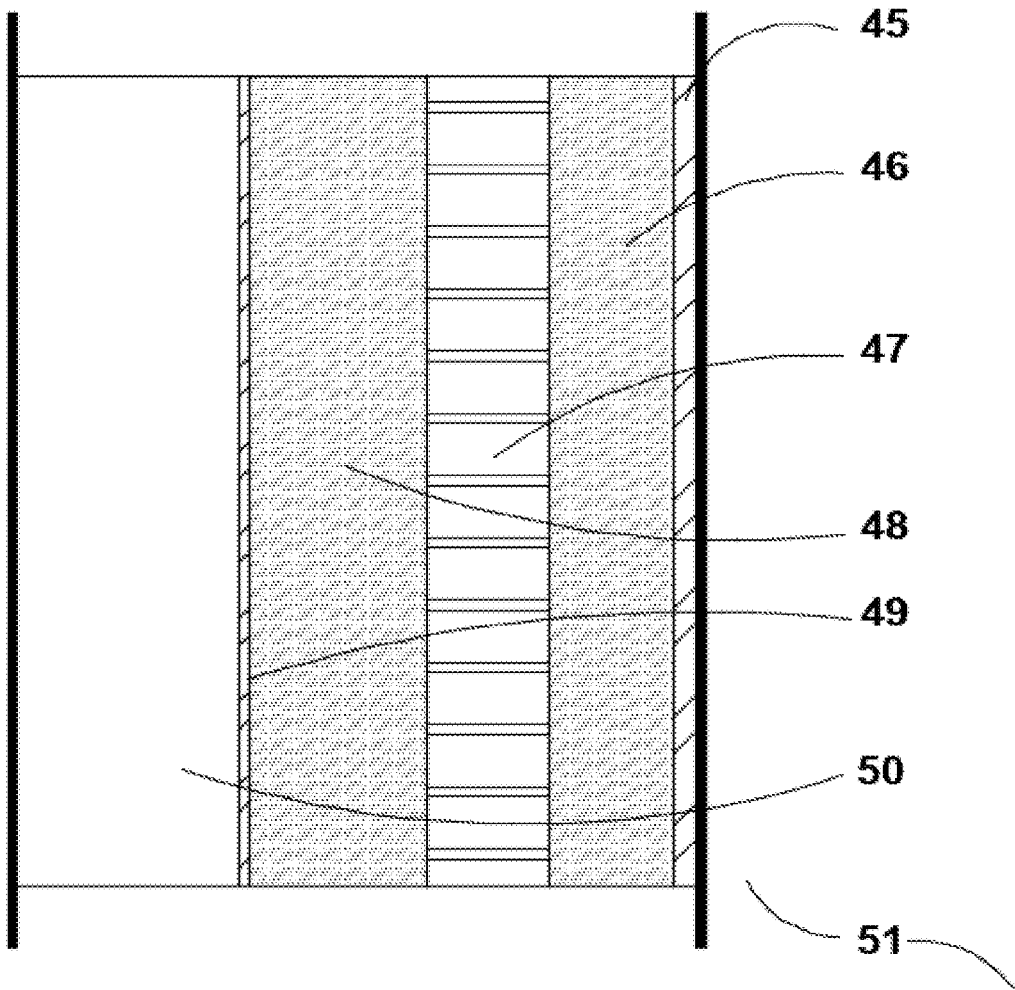
FIG. 8 is a schematic detail of FIG. 7 disclosing a method of thermally isolating the frost collection surfaces.

FIG. 8 is a schematic detail of FIG. 7 disclosing a method of thermally isolating the frost collection surfaces. In the exemplary embodiment of FIG. 8 special thermal isolation of the collection area of the system from the outside ambient temperature is required due to the very large dT that will exist between them. For example, the dT between the collection area temperature and the outside ambient temperature may be 70° C. . . . 80° C. . . . 90° C. or greater. In order to maintain a reasonable overall system size a layered approach has been devised to limit the thickness of the insulated shell 31 to 2.6 centimeters. The exemplary embodiment of FIG. 8's layered approach reduces the insulated shell 31 by at least 28 centimeters over normal refrigeration insulation materials. In the exemplary embodiment of FIG. 8 on the ambient outside wall, interacting with ambient temperature 51, is a fiberglass outer shell 45, followed by a 0.7 cm layer of Aerogel 46 and then an air pocket spacer panel made up of two staggered layers of Polycore panels 47 totaling 0.68 cm in thickness. After the Polycore panels 47 is a 1 cm thick layer of Cryogen Z 48 attached to a stainless steel inner structural shell 49 exposed to the collection area temperature 50. The aforementioned layered approach in 2.6 centimeters restricts a 90° C. dT to transfer only 30 Watts per hour over a 1 square meter surface area.

Figure 9:
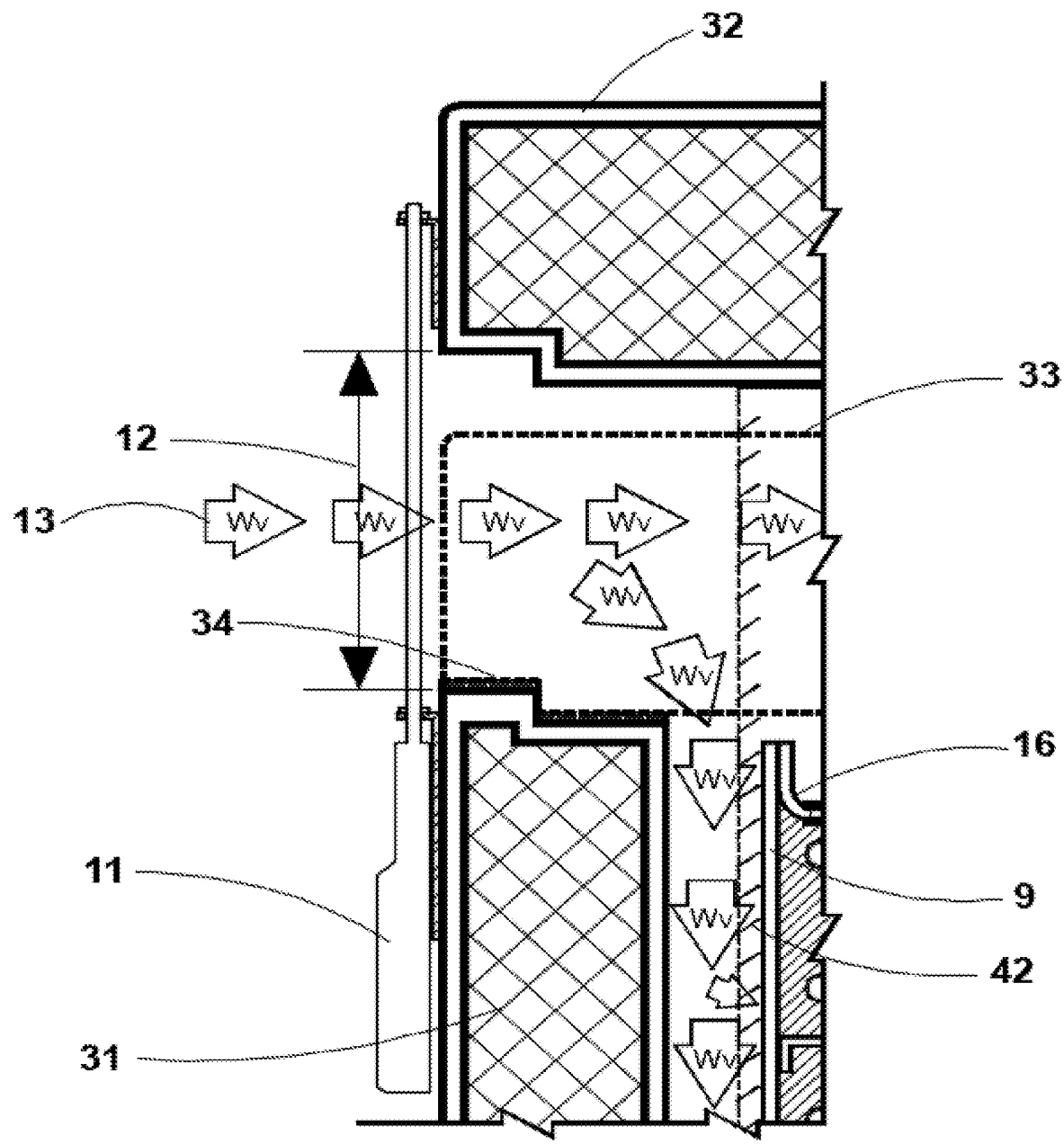
FIG. 9 is another schematic detail of FIG. 8 disclosing a method of controlling the volume cycles between the frost collection surfaces.

FIG. 9 is a schematic detail of FIG. 7 further detailing the water vapor 13 flow pattern into the collection area detailing the insulated lid (open) 32, insulated lid (closed) 33, lid seal 34, insulated shell 31, scraper actuator 11, scraper path 12, PCM encapsulation tank 16, frost collection surface 9 and scraper panel 42.

Figure 10:
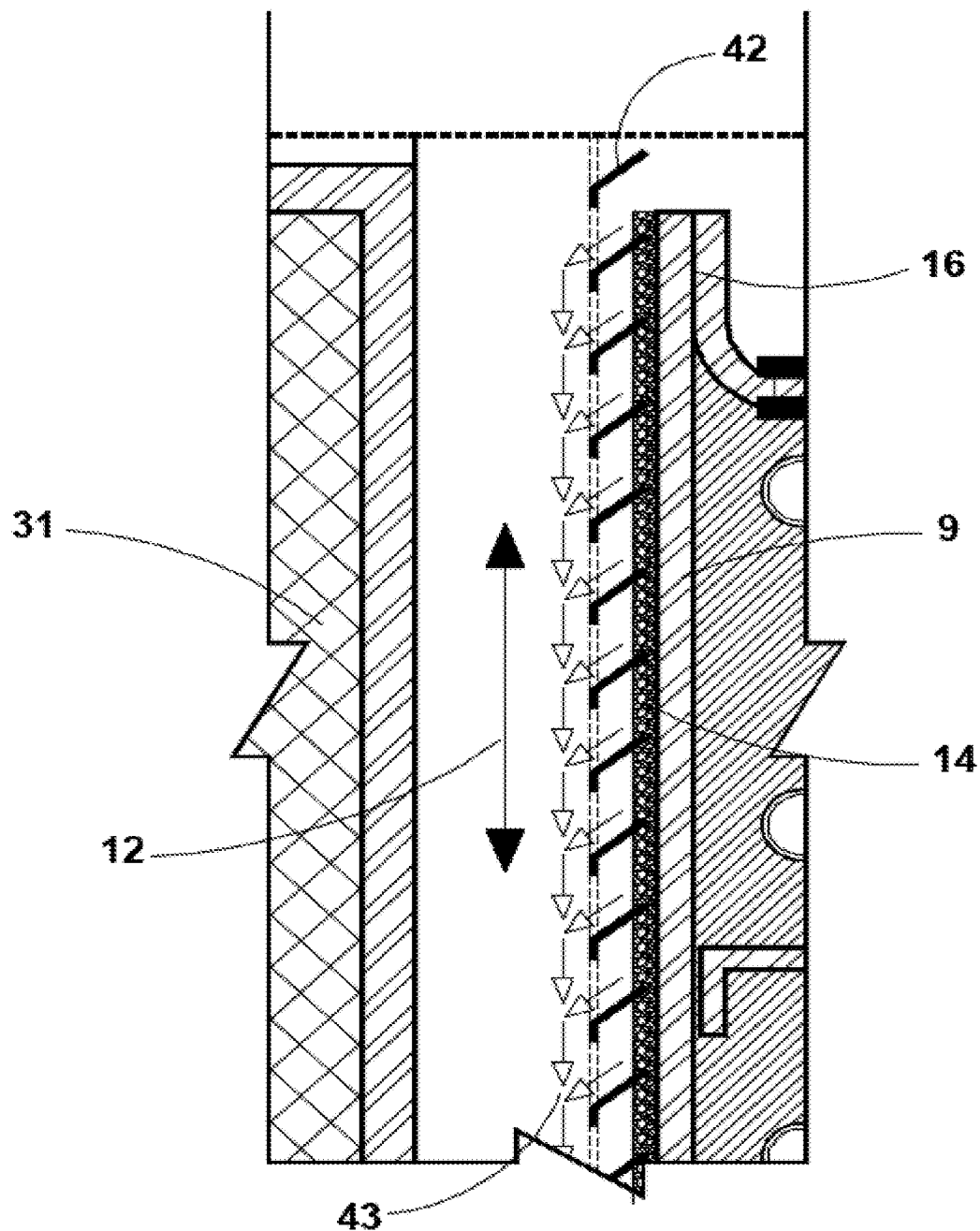
FIG. 10 is another schematic detail of FIG. 7 disclosing a method of removing frost from the collection surfaces into an integrated water tank.

FIG. 10 is a schematic detail of FIG. 9 further detailing the frost 14 scraping flow delineating the insulated shell 31, PCM encapsulation tank 16, frost collection surface 9, scraper path 12, scraper panel 42 and frost drop direction 43.

In the exemplary embodiments described herein, the following reference numerals have the identified label/structure/operation:

1. Input energy
2. Compressor
3. Fan
4. Switch
5. Temperature sensor
6. Condensing coil
7. Expansion device
8. Evaporation coil
9. Frost collection surface
10. Scraper
11. Scraper actuator
12. Scraper path
13. Water Vapor
14. Frost
15. Thermal Energy
16. PCM encapsulation tank
17. Low temperature PCM
18. Brazed plate heat exchanger
19. In-flow conduit
20. Out-flow conduit
21. Liquid water collection basin
22. Liquid water
23. Interior tank bracing
24. Evaporator inlet hole
25. Evaporator outlet hole
26. PCM tank filler opening
27. PCM tank breather opening
28. Temperature sensor tube
29. Temperature sensor leads
30. Ball valve
31. Insulated shell
32. Insulated lid (open)
33. Insulated lid (closed)
34. Lid seal
35. Tank insulation
36. Tank seal
37. Tank thermal sink
38. Water float valve
39. Cool dry air vent
40. Air float valve
41. Cool dry air
42. Scraper panel
43. Frost drop direction
44. Liquid water outlet
45. Fiberglass outer shell
46. Aerogel
47. Polycore panel
48. Cryogen Z
49. Inner structural shell
50. Collection area temperature
51. Ambient temperature

What is claimed is:

1. A system for attracting, capturing and converting atmospheric water vapor into useful liquid water comprising:
   a compressor;
   a capillary tube expansion device with one end embedded in a volume of a Low Temperature Phase Change Material with a phase change temperature below the triple point temperature of water at one atmosphere (LTPCM);

a fan and a condensing coil with one end of the condensing coil connected to a discharge port of the compressor and the other end connected to the capillary tube expansion device;

a frost collection surface and LTPCM tank with an evaporation coil embedded in the volume of LTPCM, with one end of the evaporation coil connected to a suction port of the compressor and the other end connected to the capillary tube expansion device;

a volume of working fluid in the coils' closed-loop;

a temperature-sensing switch connected to the PCM volume to control the on/off state of the compressor;

an automated open/close atmospheric inlet vent;

a cool air outlet vent;

an automatic frost scraping mechanism with ample free space to allow an incoming atmospheric volume to flow freely;

a temperature-sensing switch connected to condensing coil to control the on/off state and speed of the condensing coil fan;

a holding tank for liquid water with a dispensing mechanism;

a scraping and air flow system on/off mechanism based on water tank volume; and a specialized layering configuration of insulation protecting collection tank area temperatures from higher system temperature or ambient temperature.

2. The system of claim 1, wherein thermal energy is harvested and/or transported from the condensing coils of the system deliverable as useful energy to another system.

3. The system of any claims 1-2, wherein;
the compressor comprises a Stirling Chiller;
the condensing coil comprises a regenerator; and
the evaporation coil is closed looped and attached to the chilling head of the Stirling Chiller.

4. The system of any claims 1-2, wherein;
the compressor comprises thermoelectric module chillers;
the condensing coil comprises a heat sink; and
the evaporation coil is closed looped and attached to the chilling side of the thermoelectric module chillers.

5. The system of any claims 1-2, wherein;
the compressor comprises an electro-acoustic transducer;
a resonator is added;
the condensing coil comprises a high temperature heat exchanger;
the capillary tube comprises a regenerator;
a low temperature heat exchanger is added; and
the evaporation coil is closed looped and attached the low temperature heat exchanger.

6. The system of any claims 1-2, wherein;
the evaporation coil's volume of refrigerant is trapped by closed ball valves when the compressor is "OFF".

7. The system of any claims 1-2, wherein;
the condensing coil and fan comprises a brazed plate heat exchanger to transfer thermal energy to a separate system.

\* \* \* \* \*